No. 608,698. Patented Aug. 9, 1898.
W. MEEKER.
BEARING FOR VEHICLE WHEELS.
(Application filed Apr. 1, 1898.)

(No Model.)

Witnesses:

Inventor:
Wm Meeker
By R. J. McCarty
Attorney

UNITED STATES PATENT OFFICE.

WILLIAM MEEKER, OF DAYTON, OHIO.

BEARING FOR VEHICLE-WHEELS.

SPECIFICATION forming part of Letters Patent No. 608,698, dated August 9, 1898.

Application filed April 1, 1898. Serial No. 676,049. (No model.)

*To all whom it may concern:*

Be it known that I, WILLIAM MEEKER, a citizen of the United States, residing at Dayton, in the county of Montgomery and State of Ohio, have invented certain new and useful Improvements in Bearings for Vehicle-Wheels; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

This invention relates to new and useful improvements in vehicle-spindles.

The objects of the said invention are, first, to provide means for preventing the wheels from leaving the spindles in the event of a spindle-nut becoming accidentally loosened, and, secondly, to provide effectual means for preventing dust from entering the spindles.

To these ends the invention consists in the construction of the spindles and the sleeves thereon, as will be particularly described in the following specification in connection with the annexed drawings, of which—

Figure 3:
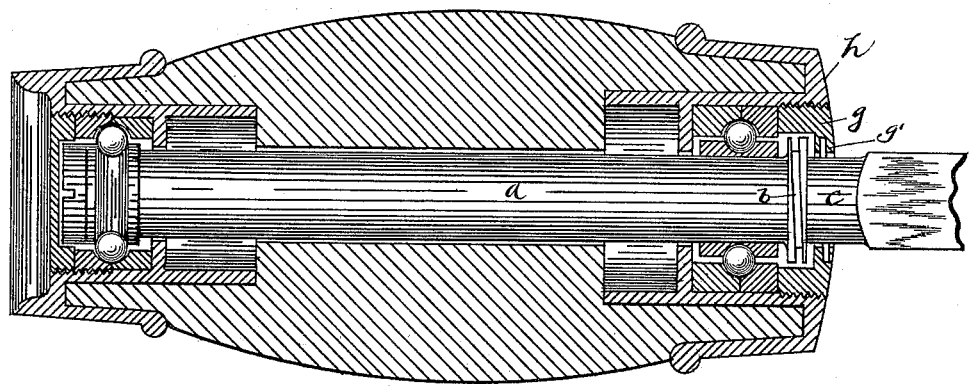
Figure 1:
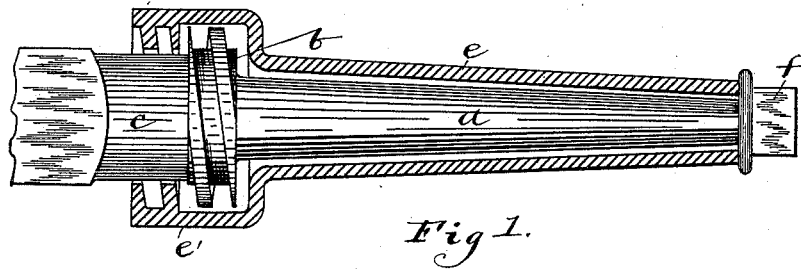
Figure 2:
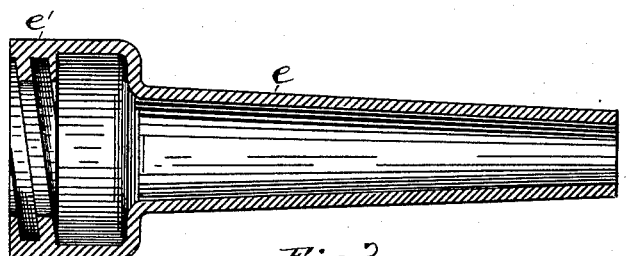

Figure 1 is an elevation of a spindle and sectional view of a sleeve constructed in accordance with my invention. Fig. 2 is a longitudinal sectional view of the sleeve removed from the spindle. Fig. 3 is a longitudinal sectional view showing the invention applied to the ball-bearing hub patented by myself February 2, 1897.

Referring to Figs. 1 and 2, $a$ designates a tapering axle-spindle. My invention consists in part in providing the integral collar $b$ thereof with peripheral screw-threads and in continuing the rounded form of said spindle a suitable distance on the inside of the said collar, as at $c$. The spindle-sleeve $e$ is essentially longer than the distance between the outer end of the spindle and the collar. The prolongation of said sleeve enables the inner end to reach in beyond the collar. The extreme inner end $e'$ of said sleeve is provided with interior screw-threads that enable it to be screwed over the collar to the position shown in Fig. 1. When in this position, the interiorly-screw-threaded end incloses the inner rounded part $c$, this latter part of said spindle being large enough to effectually close up the space between it and the aforesaid inner end of said sleeve. When the sleeve is thus placed on the spindle, the inner side of the collar $b$ forms a wall to throw inwardly away from the bearings any dirt or dust that might possibly enter between the screw-threads on the sleeve and the inner end $c$ of the spindle. The sleeve when screwed over the spindle-collar turns with the vehicle-wheel in a direction opposite to the movement necessary to screw it over the spindle-collar. This being the case, should the spindle-nut $f$ become detached from the end of the spindle the collar and the inner screw-threads on the sleeve will prevent the wheel from leaving said spindle.

In Fig. 3 the spindle $a$ is provided with the peripherally-screw-threaded collar $b$ and the extended round portion $c$ of the spindle; but in adapting the invention to the ball-bearing hub shown in this figure the long sleeve $e$ is necessarily dispensed with and a shorter exteriorly and interiorly screw-threaded sleeve or cap $g$ is substituted. This sleeve $g$ has all the essential features of the long sleeve $e$—namely, the interior screw-threads $g'$, which enable it to be screwed over and beyond the collar. The exterior screw-threads thereon enable the said sleeve or cap to be screwed into the hub-band $h$ on the outer end of the hub.

Having described my invention, I claim—

1. In a vehicle-axle, the combination with a spindle having a collar thereon provided with peripheral screw-threads, of a sleeve the inner end of which is provided with interior screw-threads by which said end may be screwed over said collar to inclose the inner side thereof, whereby means are provided for keeping dust from the spindle, and for preventing said sleeve from leaving the spindle, substantially as described.

2. In a vehicle-axle, the combination with a spindle having a collar thereon provided with peripheral screw-threads, and a portion of said spindle on the inside of said collar continuing in the rounded form of the spindle as described, of a sleeve the inner end of which is provided with interior screw-threads adapting said end to be screwed over the collar, whereby means are provided for keeping the inclosed portion of the spindle free from dust, and for preventing said sleeve from leaving the spindle.

3. In a vehicle-axle, the combination with a spindle having a collar thereon provided with peripheral screw-threads, and the portion of said spindle adjacent to the inner side of said collar being continued in rounded form as described, of a sleeve of greater length than the distance from the outer end of the spindle and the collar, the inner end of said sleeve being provided with interior screw-threads that adapt it to be screwed over the collar and to occupy a position on the inner side of said collar, substantially as and for the purposes specified.

In testimony that I claim the foregoing as my own I hereto affix my signature in presence of two witnesses.

WILLIAM MEEKER.

Witnesses:
R. J. McCARTY,
JOHN W. KALBFUS.